United States Patent [19]

Carlson

[11] Patent Number: 5,418,971
[45] Date of Patent: May 23, 1995

[54] SYSTEM AND METHOD FOR ORDERING COMMANDS IN AN AUTOMATIC VOLUME PLACEMENT LIBRARY

[75] Inventor: Wayne C. Carlson, Tucson, Ariz.

[73] Assignee: International Business Machines Corporation, Armonk, N.Y.

[21] Appl. No.: 871,379

[22] Filed: Apr. 20, 1992

[51] Int. Cl.⁶ ............................................. G06F 12/00
[52] U.S. Cl. .................................. 395/800; 395/425; 395/275; 364/280.4; 364/280.5; 364/DIG. 1; 360/92
[58] Field of Search ........... 364/DIG. 1, 280.5, 280.4; 395/425, 275, 800; 360/92

[56] References Cited

U.S. PATENT DOCUMENTS

| | | | |
|---|---|---|---|
| 3,623,006 | 11/1971 | Balakian | 364/DIG. 1 |
| 4,228,500 | 10/1980 | Webster | 364/DIG. 1 |
| 4,656,582 | 4/1987 | Chaitin et al. | 364/300 |
| 4,763,255 | 8/1988 | Hopkins et al. | 364/300 |
| 4,945,428 | 7/1990 | Waldo | 360/92 |
| 5,287,459 | 2/1994 | Gniewek | 395/275 |

Primary Examiner—Alyssa H. Bowler
Assistant Examiner—Walter D. Davis, Jr.
Attorney, Agent, or Firm—Manny Schecter; Andrew J. Dillon

[57] ABSTRACT

A system and method of sequencing commands for operation of a volume positioning mechanism in an automated library is taught. The automated library has a plurality of volumes, a plurality of racks for storing the plurality of volumes and at least a first drive unit for recording data to or reading data from a volume mounted thereon by the volume positioning mechanism. Exogenous requests for data stored to the volumes or for storing data to volumes are received from time to time by the library. Each exogenous request for data in a volume is utilized to generate at least a first command for execution by the volume positioning mechanism. Commands as generated are stored in a command queue having a queue input level, a queue output level for the next scheduled command for execution and allowing a plurality of intervening levels. With each introduction of a new command to the command queue, the command queue is reordered with a goal of improving time to dispatch for execution of high priority commands.

9 Claims, 5 Drawing Sheets

SYSTEM AND METHOD FOR ORDERING COMMANDS IN AN AUTOMATIC VOLUME PLACEMENT LIBRARY

BACKGROUND OF THE INVENTION

1. Technical Field

This invention relates generally to the field of automated storage libraries and more particularly, to a system and method for sequencing commands to a tape cartridge transporter for efficiently moving tape cartridges between storage racks and drive units for cartridge playback and recording.

2. Description of the Related Art

Numerous business applications require very large databases for storing information used in the business on a continuous basis. Database storage requirements may exceed 100s or 1,000s of gigabytes of data. Data storage costs generally limit such large databases to being stored on magnetic tape, which presently offers the lowest data storage costs. A premium is placed upon speed and reliability of recovery of data, particularly when relatively frequent access to the information stored within the database occurs. However, tape storage generally requires the longest access time for retrieving the stored data of the major data storage systems. For example, once a tape is loaded onto a tape drive, accessing the data stored on the loaded tape is substantially slower than accessing data stored on a direct storage access device (DASD) (e.g. a disk drive). Substantial delay is also incurred in locating and mounting the desired volume, be it on tape, magnetic disk or optical disk. Automated storage libraries offer improved speed and reliability for storing and retrieving data stored on storage media, including magnetic tape. Early magnetic tape databases required an operator to retrieve a tape from a shelf and load the tape on a tape drive. This was very slow and prone to operator mistakes. Also, early magnetic tape reels were relatively large, i.e., 10.5 inch diameter reels, and furthermore, only 9 tracks were available for writing data to the tape. Correspondingly large areas were necessary to store the many required 10.5 inch magnetic tapes. Newer magnetic tapes are protected by a cartridge housing, and are substantially smaller than the 10.5 inch reels. Additionally, data can now be written to 36 tracks or more. Hence, each magnetic tape cartridge can store many times more data than the older reels. The advances made in magnetic tape technology have made automated cartridge libraries more effective since smaller areas are required to store more data on lighter weight cartridges.

Access time and reliability is improved by automatically managing the storage and retrieval of tape cartridges. Automated cartridge libraries include a plurality of storage slots for storing library resident tape cartridges, a robotic picker mechanism, and one or more tape drives. The robotic picker operates on command to transfer a tape cartridge between a storage slot and a tape drive within seconds. Operational benefits of using an automated cartridge library include: greater reliability in tape cartridge mounts; better predictability in request-to-mount time; and improved off-shift availability. An input/output port is also provided on the automated cartridge library for inserting and exiting cartridges from the library.

Further reduction in time between request and response may be had by efficient utilization of the resources of the automated library. Efficient utilization demands first that mounts and demounts of tape cartridges be avoided and second, that when mounts and demounts are unavoidable, that they be carried out expeditiously. Reduction in the frequency of mounts and demounts is achieved through organization of data requests to minimize the demand for tape mount and demount operations. An example of such a system is disclosed in U.S. Pat. No. 4,876,662, to Pence, which is assigned to the assignee of this patent. The U.S. Pat. No. '662 patent also discusses algorithms for selecting appropriate levels in an hierarchical storage for storage of data. The second route to improving efficiency in utilization of an automated library is through efficient dispatch of the robotic picker mechanism to perform outstanding requests for tape mounts and demounts.

SUMMARY OF THE INVENTION

It is one object of the present invention to provide control of a volume transporter in an automated data processing server library.

It is another object of the present invention to provide a system and method for ordering commands to the volume transporter in an automated data library to improve efficiency of operation.

The foregoing and other objects are achieved as is now described. A system and method of sequencing commands for operation of a volume positioning mechanism in an automated library is taught. The automated library has a plurality of volumes, a plurality of racks for storing the plurality of volumes and at least a first drive unit for recording data to or reading data from a volume mounted thereon by the volume positioning mechanism. Exogenous requests for data stored on the volumes or for storing data to volumes are received from time to time by the library. Each exogenous request for data in a volume is utilized to generate at least a first command for execution by the volume positioning mechanism. Commands as generated are stored in a command queue having a queue input level, a queue output level for the next scheduled command for execution and allowing a plurality of intervening levels. With each introduction of a new command to the command queue, the command queue is reordered with a goal of improving time to dispatch for execution of high priority commands.

A sequence is ordered by selecting a command for each level of the queue in accordance with selected optimizing criteria. Commands are qualified for execution at a level. Upon identification of a qualified command, it is scored in accordance with the qualifying criteria. Scoring a command for execution is a function of its time in the command queue, the priority of the exogenous request from which the command was generated and the location of the volume positioning mechanism relative to the position of relevant volume in the projected machine state. The qualified command with the highest score is positioned in the command queue at the level for which it received the score. Stored with a command at a level in the command queue is a projected system state occurring after execution of the command.

Once a command is placed at a level during an ordering operation, the command is disqualified for consideration at any remaining levels, absent a backtracking operation. A backtracking operation occurs in response to failure of any available command to be qualified for a level during command sequence ordering. In such an event, the current level for evaluation is reset to the immediately preceding level. The command at the new current level is removed and disqualified from its place in the queue. The projected system state is reset to the projected system state saved for a level preceding the new current level. The remaining qualified commands are then rescored to select a new command for the new current level.

After a sequence is completed, a "peephole" optimization is performed on the sequence. The ordering of the commands in the command queue is analyzed for occurrence of certain predetermined patterns. Commands falling in such patterns are replaced with complex commands, incorporating two or more operations of the volume positioning mechanism into simultaneous actions, e.g. a dismount of a volume from the drive unit occurring with a volume mount.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
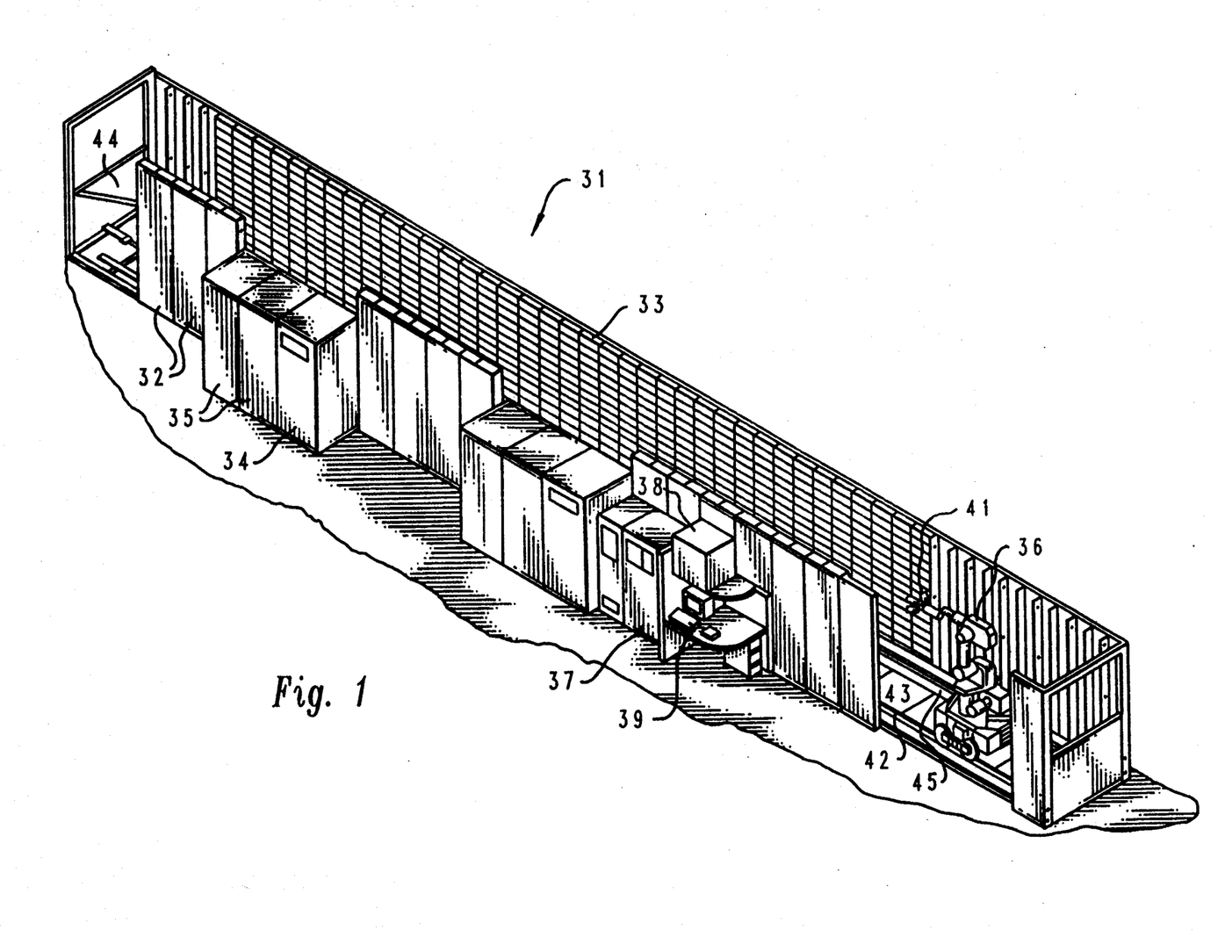
FIG. 1 is a pictorial diagram of an automated storage library having an anthropomorphic robotic picker.

With reference now to the figures and in particular with reference to FIG. 1, is depicted an automated cartridge library 31 for managing a large database, wherein data is stored on magnetic tapes. Each magnetic tape is housed in a plastic cartridge for protecting the magnetic tape and providing a convenient handling mechanism for a robotic picker. The automatic cartridge library 31 includes a plurality of modules 32, wherein each module is made from a plurality of magazine holders 33 (not shown). Each magazine holder consists of a plurality of storage slots (not shown), and each storage slot is capable of storing a magnetic tape cartridge therein. The automatic cartridge library 31 also includes at least one tape unit, for example, an IBM 3490 or IBM 3490E Magnetic Tape Subsystem having a controller 34 and tape drives 35. A robot 36, having a gripper/vision assembly 41 attached thereto, travels on an outrigger rail 42 and a guide rail 45 to transfer tape cartridges between the storage slots 33 and the tape drives 35. The robot 36 is anthropomorphic in that it is capable of human-like motions. A suitable anthropomorphic robot 36 is Model GMF S-10 robot, manufactured by Fanuc, Ltd. Robot 36 is depicted with one gripper/vision assembly 41, but may be provided with two or more such assemblies allowing robot 36 to perform two or more operations at a single location, such as a demount and a mount of tape cartridges from a tape drive 35.

A robot controller 37, attached to the automatic cartridge library 31, commands the robot 36. A service bay 43 for the robot 36, is located at one end of the automated cartridge library 31. The service bay 43 functions as a parking space for the robot 36 when it is not in use or when it is being serviced. An operator access bay 44 is provided at the other end of the automatic cartridge library 31 allowing service personnel to enter. A remote terminal bay 38, accessible internally by the service personnel, is attached to the automated cartridge library 31. A library manager 39 is connected to system 31. Library manager 39 allows an operator to determine system status, promote a tape cartridge mount status, and generally enter external instructions into the automated cartridge library 31. Library manager 39 is provided by an appropriately programmed microcomputer such as an IBM PS/2 personal computer.

The automated cartridge library 31 is expandable for storing additional tape cartridges or improving access time. Additional modules 32 can be added for increasing storage capacity. Additional outrigger rail 42 and guide rail 45 must then be added to allow the robot 36 to travel the additional distance. Also, the operator access bay 44 may be replaced by a second service bay 43 adding a second robot. An input/output port is also available (not shown) to allow an operator to add or remove tape cartridges to and from the automated cartridge library 31. Once a set of tape cartridges have been inserted into the input port, the robot 36 can be instructed to identify the tape cartridges and move them accordingly. Similarly, an operator is prompted to remove tape cartridges previously inserted into the output port by the robot 36.

Figure 2:
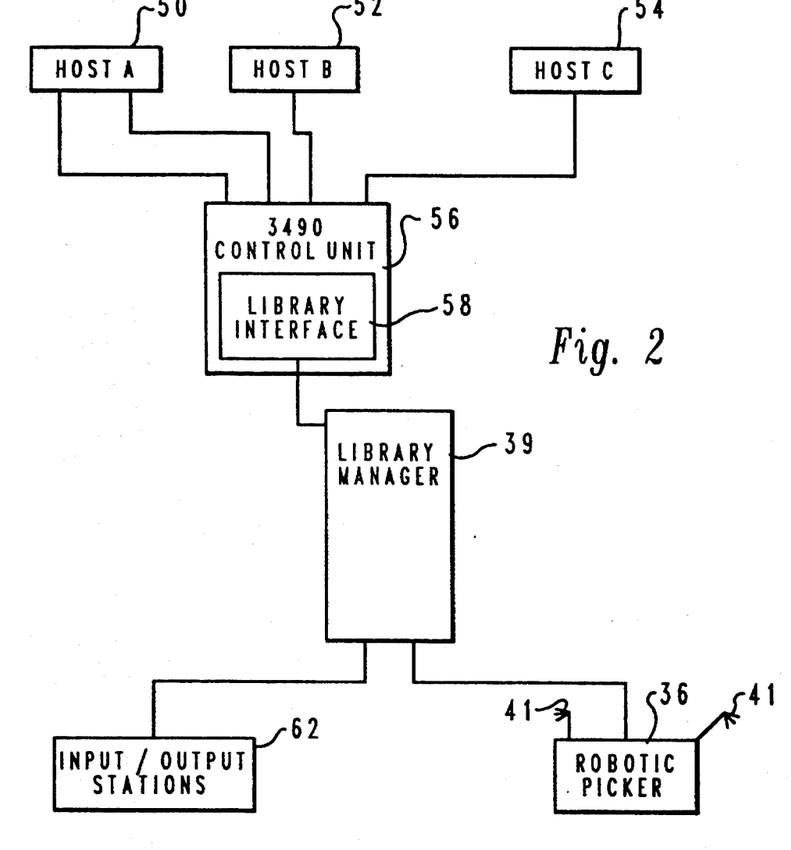
FIG. 2 is a block diagram of the components of an automated storage library.

FIG. 2 depicts a block diagram of an automated data processing system library, wherein three host computers 50, 52 and 54 are connected to a library control unit 56. The host computers are not, in general, required to have access to the status of the automated library. Each of hosts 50, 52 and 54 generate periodic data requests which are passed by control unit 56 through a library interface 58 to a library manager 39. Library manager 39 converts the requests into commands executable by robotic picker 36 or one of a plurality of grippers 41. Library manager 39 may be provided by an appropriately programmed personal computer such as an IBM PS/2. A keyboard and video display monitor, as represented by Input/Output station 62 permit interaction or provide override control to an operator.

Figure 3:
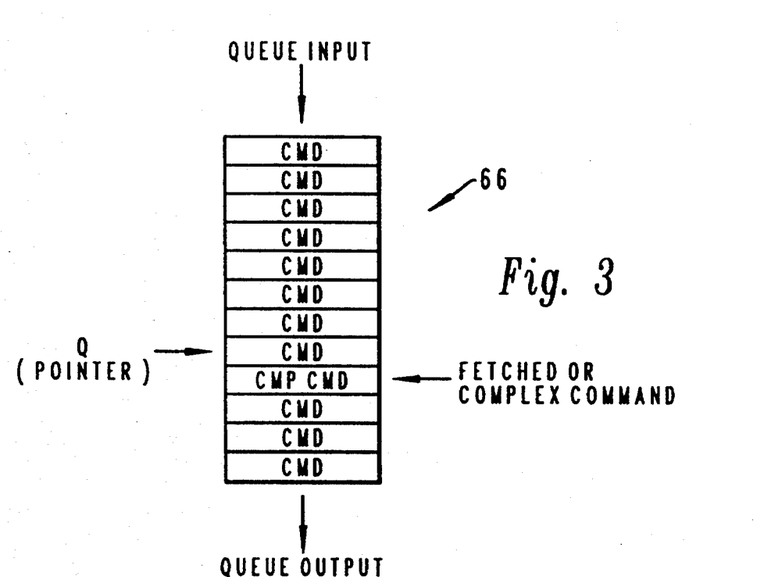
FIG. 3 depicts a data structure for a command queue utilized in practicing the system and method of the present invention.

FIG. 3 illustrates a command queue 66 which is constructed and periodically reordered by library manager 39. Command queue 66 includes an queue output level holding the next command for execution and a queue input level to which commands (CMD) are initially introduced to command queue 66. Complex commands (CMPCMD) are never initially placed in the queue input level, but are introduced to the command queue only after a reordering of the queue and a subsequent substitution of the complex command for two or more adjacent simple commands. Commands which are complex or which have been "fetched" cannot be reordered. As a command approaches the queue output it is increasingly likely to be fetched, or locked in for execution by robot 36. Increasingly complex command lists can exist for robots having three or more arms, or for systems utilizing more than one robot.

A pointer "Q" is illustrated pointing to the command (CMD) at the last level available for reordering. All commands between the level indicated by the pointer Q and the command input level are available for reordering.

Figure 4:
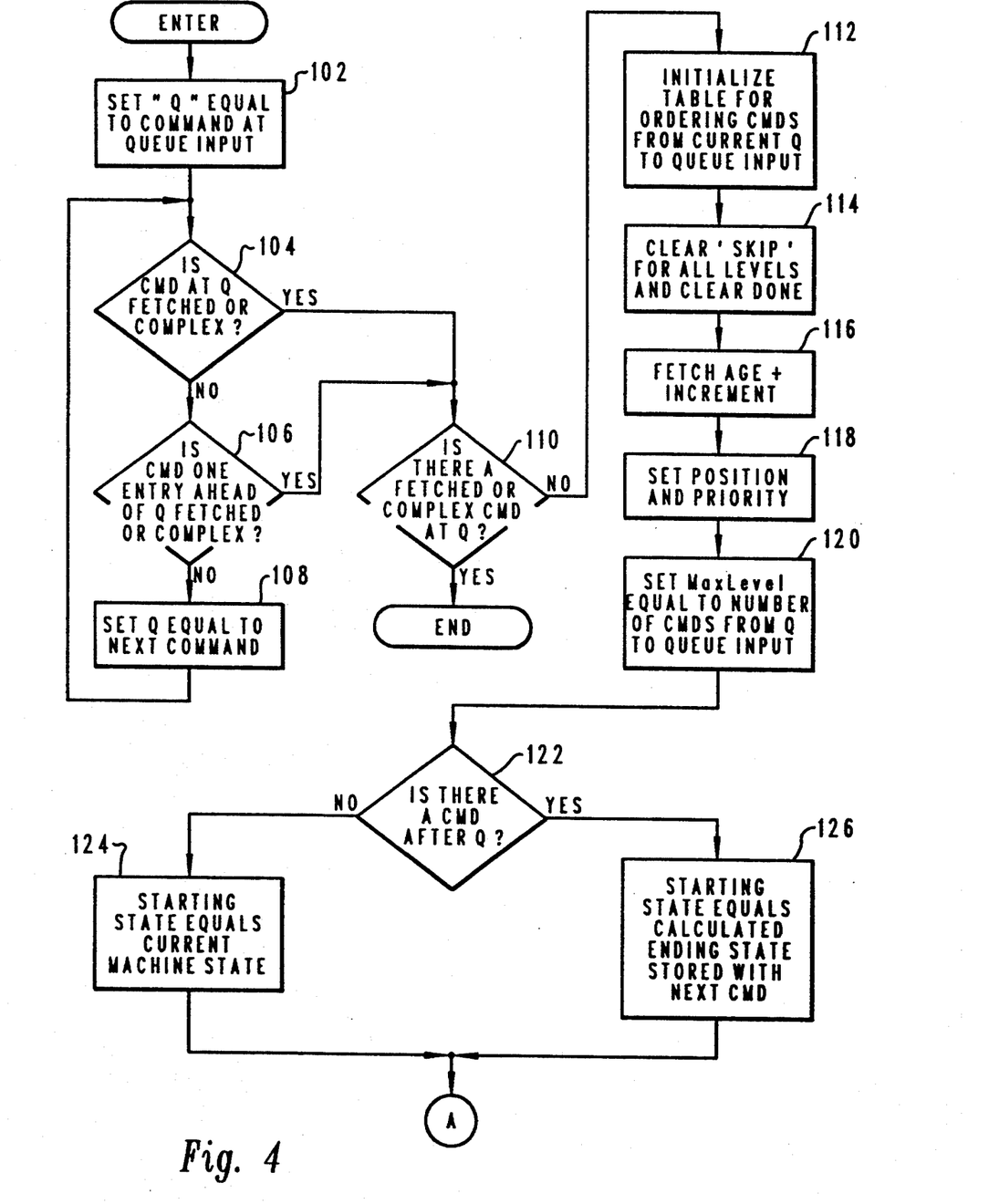
FIG. 4 is a high level logical flow chart illustrating a software implementation of command queue sequencing utilized with the system of the present invention.
Figure 5:
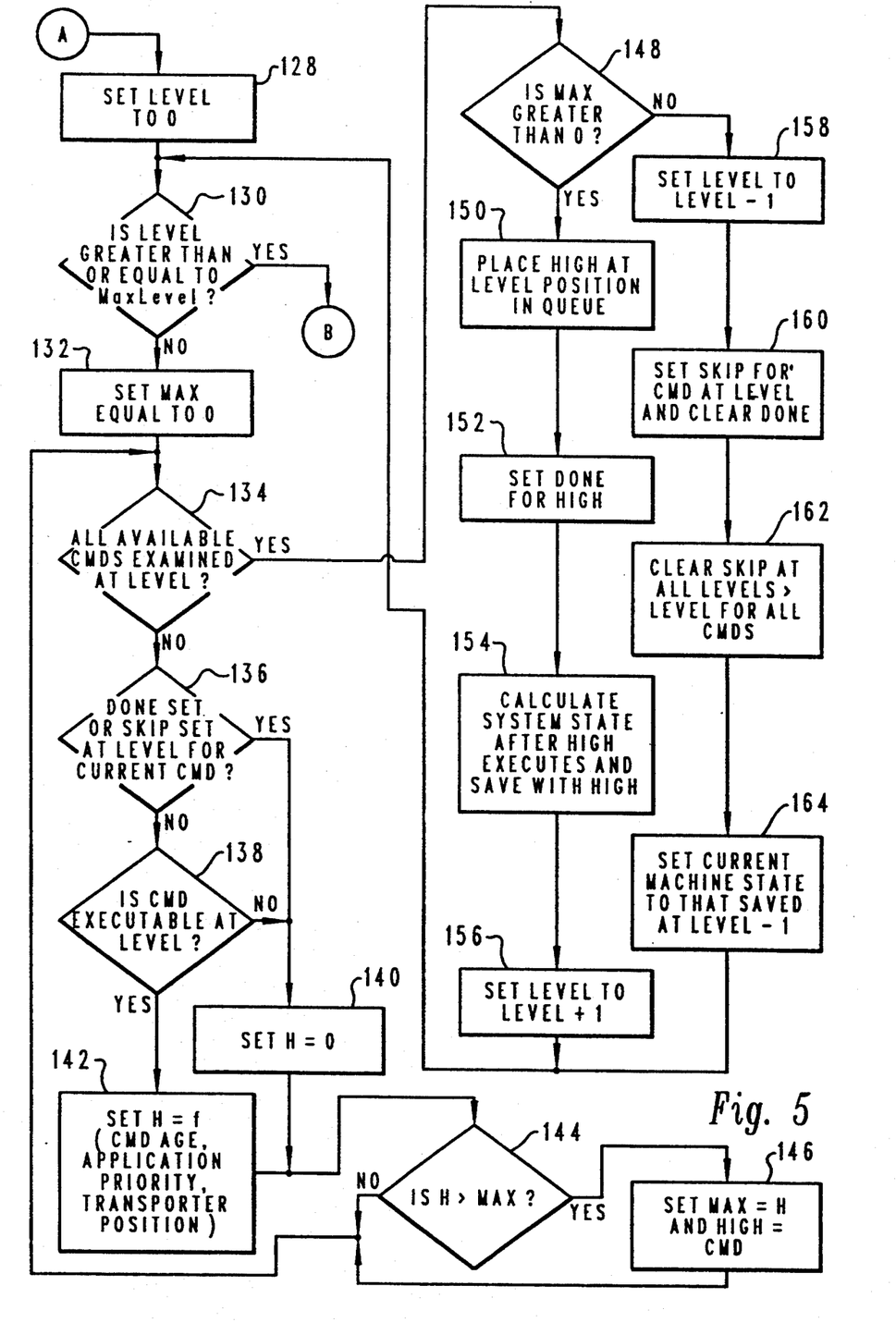
FIG. 5 is a continuation of the high level logical flow chart of FIG. 4.
Figure 6:
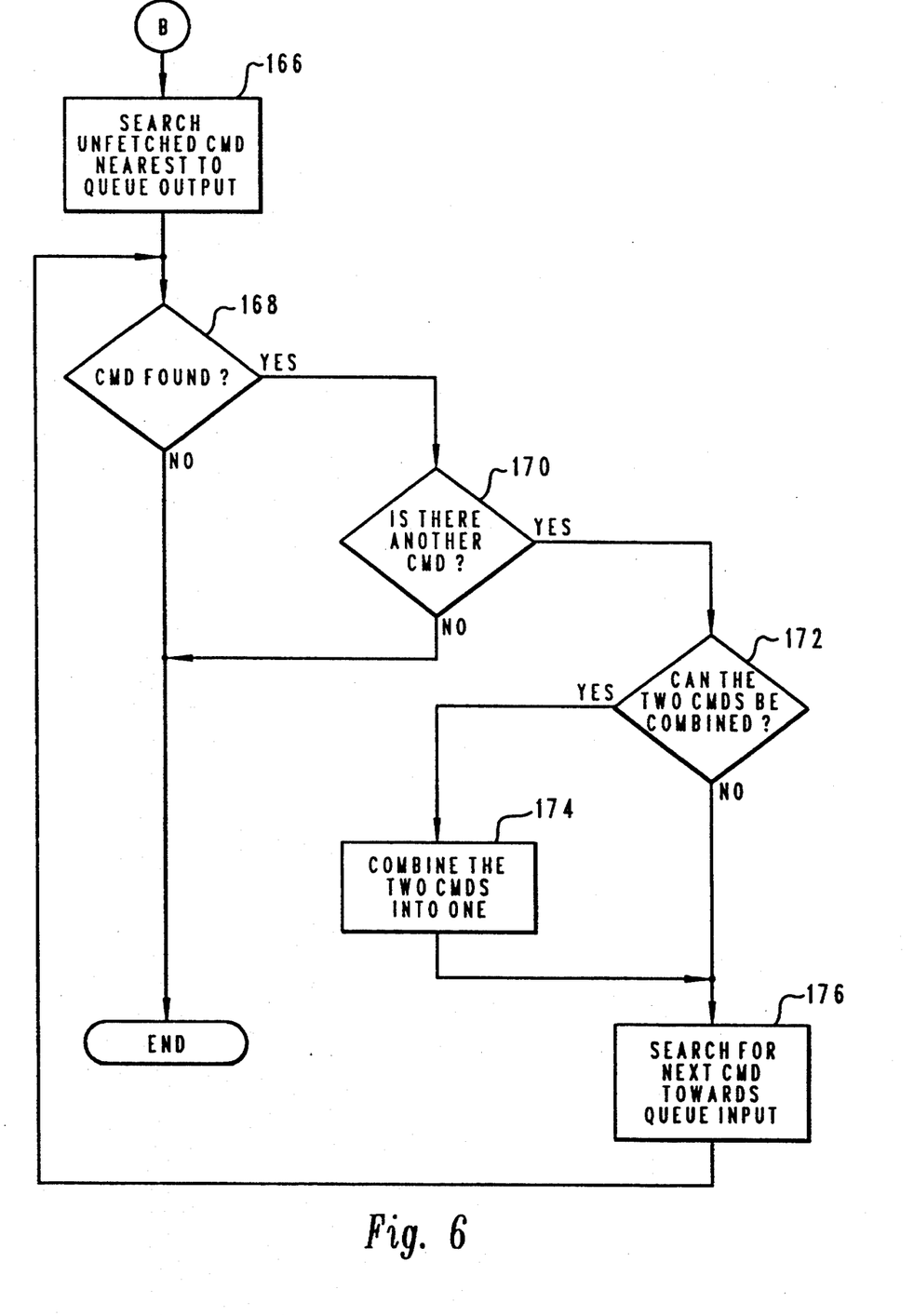
FIG. 6 is a continuation of the high level logical flow chart of FIGS. 4 and 5.

FIGS. 4, 5 and 6 depict a single high level flow chart for a software implementation of the invention on library manager 39. The initial steps of the process are utilized to determine if any commands are present in the command queue which are available for possible reordering. The process is entered with the introduction of a command to the queue at the command queue input. A command upon initial introduction to a queue at the queue input will be executable. If no command ordering is done, the sequence of commands will be an executable sequence. At process step 102 the pointer Q is set to point to the command at the command queue input. Next, decision step 104 is executed to determine if the command to which Q points is fetched or if it is complex. If not, the NO branch from leads to execution of decision step 106 to determine if the command at the command queue level one closer to the queue output is a fetched or complex command. Again taking the NO branch, process step 108 is executed to increment Q to point queue level just interrogated and the process is returned to loop through steps 104, 106 and 108 until a queue level having a fetched or complex command is encountered. While it is not strictly necessary to reexecute step 104 for this loop, conservative design considerations are adhered to for the sake of reliability.

The YES branches for both steps 104 and 106 both lead to execution of decision step 110, where it is determined whether there is a fetched or complex command at the level indicated by Q. If there is, it is an indication that the command just entered to the queue has been immediately fetched, and thus no optimization can be done. The YES branch from step 110 leads to immediate termination of the process. The NO branch is taken where even one command is indicated available for optimization in ordering.

Execution of the ordering strategy requires initialization of certain data structures, determination of values for certain variables and calculation of pointers as provided by steps 112 through 126. Step 112 is executed to initialize a table for ordering the commands between the level to which Q points in the command queue and the queue input, inclusive. Next, step 114 is executed to clear the "SKIP" and "DONE" variables for each command. The "SKIP" command is independently set for a command for each level of the command queue. When SKIP is set it indicates that the command has been blocked from placement at a certain level, even though it technically may be executable at the level. Basically a SKIP is set upon determination that placement of a certain command at a level as part of a particular sequence leads to a system state where no remaining available command can be executed at a level closer to the input. A DONE is set for a command after it has been placed at a level in the queue during reordering. The DONE label makes a command "unavailable" for further placement in the queue.

The period of time a command is in command queue 66 is tracked. The age of a command is considered in scoring a command for priority of execution. Essentially, efficiency notwithstanding, all requests are eventually honored, even where other requests of higher priority are continuously being received. Step 116 is executed for each command in command queue between the pointer Q and the queue input to determine a command age. The age equals the age stored for the variable during the last operation of the ordering process plus an increment for the elapsed time since such operation.

Execution of certain commands involves movement of robot 36. Those operations close at hand are preferred to those far away. Thus the position of the robot or transporter from the location of an operation is determined for each command. A priority derived from the priority of the request underlying a particular command is also assigned a command. Position and priority are thus determined at step Finally, at step 120 a variable "MaxLevel" is set equalling the number of commands present for ordering between Q and the queue input. MaxLevel is the size in levels of the table initialized at step 112. Determination of whether a particular command can be executed in a particular order requires knowledge of what the system state will be when the command is presented. A machine or system state table is initialized at steps 122, 124 and 126. At step 122 it is determined if any commands are unavailable for ordering. If any are, the initial system state will have to be projected by execution of step 126. At step 126 the system state after execution of the first command below the level pointed to by Q is determined. If all commands in the command queue are available for ordering, the starting state is simply the current system state (step 124).

FIG. 5 depicts the steps relating to actual ordering of a group of commands for execution. LEVEL is counter pointing to the command ordering table established in step 112. With execution of process step 128 LEVEL is set to 0 to point to the bottom most, or first level in the table available for execution. Decision step 130 represents looping control for the ordering and backtracking features of the process, essentially comprising all of the steps between 132 and 164. Once the pointer LEVEL reaches one greater than the number of levels in the ordering table, the ordering process is exited (the YES branch) via step 130.

Along the NO branch from step 130, step 132 is executed to initialize the value for a variable MAX to 0. MAX will eventually receive, for each level, the score achieved by the highest scoring command for execution at a level. Looping control for entry to the scoring steps is provided by step 134. The YES branch, indicating completed scoring for all commands at a given level, sends process execution over to the backtracking and command storing features of the process, which are discussed in detail below. The NO branch from block 134 indicates that unevaluated commands remain available for possible placement at a level and thus advances the process into the actual scoring steps.

The scoring steps are steps 136 through 146. At step 136 the variables (or flags) DONE and SKIP for current level are evaluated for a command presented for scoring. If either flag is set the command is unavailable and is assigned a default score of 0 (H=0) at step 140 along the YES branch from step 136. A score of 0 excludes a command from placement at the level under consideration. Step 138 is executed to determine if a command can be executed at the current level. Basically this includes the determination of whether the command can be executed given the projected system state upon reaching the level. For example, if the command is for mounting a tape cartridge on a drive, and the drive is already occupied, the command will not be executable. If the command is inconsistent with the projected system state, the NO branch is taken to step 140 for assignment of a score of 0 to the command.

If the SKIP and DONE flags are not set and the command is executable, the command is scored at step 142. Scoring is a summation of variable values assigned for each command and is repeated at each level. Priority values in one preferred operating environment are assigned in a range from 1 to 70 points, generated based upon priority of the exogenous request received by the system. The period of time a command has been in the queue is rated from 0 to 40 points. Initially a command has an age rating of zero, which is incremented by 2 each time the command queue is ordered. Finally, transporter position relative to the position required to carry out a task is evaluated on a scale increasing with reduction in the distance, up to a maximum of 10 points. It will be apparent now to those skilled in the art that assignment of points is to some extent arbitrary, depending upon features a designer wishes to emphasize.

With execution of step 144, the score for a command (H) is compared with the previous high score achieved at the level (MAX) by another command. If the new score is higher, step 146 is executed to reset MAX to the new high score and to set the pointer HIGH to the command just evaluated. From step 146 or along the NO branch from step 144 (i.e. the command was not scored higher than all previous scored commands for the level) the process is looped back to step 134 to determine if commands remain for evaluation.

Once all commands have been evaluated at a level, the YES branch from step 134 is taken to decision step 148. The possibility exists that no command was scored higher than 0 at a level, which is determined with execution of step 148. If no command was scored higher than 0, than pointer HIGH does not identify a command for insertion at the level just evaluated. A backtrack operation is required to identify a new command for a level just prior to the level for which no command was qualified. Along the NO branch from step 148, step 158 is executed and the LEVEL variable is reset by one place toward the output end of the queue. Next, at step 160, the command formerly installed for execution at LEVEL, is removed from its position by setting the skip flag for the command at LEVEL and by clearing its DONE flag, allowing the command to be scored for other levels. At step 162, prior SKIP flags set for levels above the current LEVEL are cleared for all commands. Finally, at step 164, the current machine state is set at that occurring after execution for the new current LEVEL less one. Operation of the process is then returned to STEP 130, allowing initialization of the appropriate variables to allow rescoring of the commands for LEVEL.

If at step 148 it was determined that a command was scored, steps 150-156 are executed to place the command receiving the score at the appropriate position in the command queue and to set the DONE flag for the command to indicate its unavailability at higher levels of the queue. With execution of step 150, the command identified by HIGH is placed at the current level indicated by LEVEL in the command queue. At step 152, the DONE flag is set for the effected command. Next, at step 154, the system state occurring with execution of the command is calculated and stored with the command. Lastly, with execution of step 156, LEVEL is incremented by one to the next following level and operation of the process is returned to step 130. When the last level has been evaluated, LEVEL will exceed MaxLevel, indicating all available commands in the command queue have been ranked for execution. The process then continues with step 166 in FIG. 6.

FIG. 6 illustrates the steps of "peephole" optimization, that is the process relating to identification of command patterns and their consolidation to form complex commands. At step 166 the command queue is searched to locate an unfetched command nearest the queue output. If no such command is found the process is complete (step 168) and is exited. If an unfetched command is located, step 170 is executed to determine if another (unfetched) command is present in the queue adjacent the unfetched command nearest the output queue. If not, no consolidation can be done and the process is concluded (the NO branch). If another unfetched, adjacent command is available, step 172 is executed to determine if the two commands can be combined. If yes, step 174 is executed to substitute a complex command for the two combined commands, at the level of the unfetched command nearest the output end of the command queue. Step 176 is executed from the NO branch of step 172 or after execution of step 174 and represents a search of the command queue for the next remaining unfetched command toward the input end of the queue from the last evaluated command(s).

EXAMPLE OF OPERATION

The original command list is invoked from host system requests. Consider a tape library system with a single transporter with two grippers. In this example, the grippers are referred to as Gr. 1 and Gr. 2, and the three devices used in the example are referred to as Dev. 1, Dev. 2, and Dev. 3. These constitute the resources of the system. The tape cartridges are identified as A, B, C, W, X, Y, and Z.

TABLE 1

| Host Request | Cartridge | Device |
| --- | --- | --- |
| Mount | A | 1 |
| Mount | B | 2 |
| Demount | C | 3 |
| Mount | D | 3 |

In the sample command sequences, the following abbreviations are used for the commands:

TABLE 2

| Action | Meaning |
| --- | --- |
| GFR | Get From Rack (Storage Area) |
| PTR | Put To Rack |
| GFD | Get From Device (Tape drive, Optical deck, etc.) |
| PTD | Put To Device |
| SAD | Swap At Device (Robotic picker or transporter with two grippers) |

The following sequence may be generated by creating two commands from each host request. The host requests are processed in the order received. Thus "Mount cartridge A on device 1" is realized with command IDs 1 and 2, "Mount cartridge B on device 2" with command IDs 3 and 4, etc. as illustrated in Table 3.

TABLE 3

| ID | Action | Cart. | Dev. | Gr. 1 | Gr. 2 | Dev. 1 | Dev. 2 | Dev. 3 |
|----|--------|-------|------|-------|-------|--------|--------|--------|
| 1 | GFR | A | | A | | | | C |
| 2 | PTD | A | 1 | | | A | | C |
| 3 | GFR | B | | B | | A | | C |
| 4 | PTD | B | 2 | | | A | B | C |
| 5 | GFD | C | 3 | C | | A | B | |
| 6 | PTR | C | | | | A | B | |
| 7 | GFR | D | | D | | A | B | |
| 8 | PTD | D | 3 | | | A | B | D |

Optimization is performed on the command list by cycling through the optimized sequence positions. At each position, every command is evaluated to determine whether it can be placed at that position and, if so, how desirable it would be to have the command so placed.

Whether or not a command may be placed in the current sequence position depends on the state of the various resources available to perform the operation. Resource status information is calculated after a command is selected and retained with each sequence position in the list. The resource status is a function of the previous status and the command selected. This allows the optimizer to deal with varying availability of the resources, as the initial state could indicate that a particular resource is not usable. Also, resources may be reassigned at this point.

The desirability factor is determined by a heuristic equation or set of equations that takes into account the amount of travel required to perform the operation, the relative importance of the associated system operation to throughput, how long the operation has been in the command list (to prevent perpetual preemption of operations), the state of resources at that point in the sequence, and other commands present in the list. This heuristic process assigns a number to each command. The higher the number, the more desirable the command is for this sequence position. A value of zero is used to indicate that a command cannot be performed in this position because of the current state of the resources. After evaluation, the command that is deemed most desirable (and possible) is placed at the current position in the sequence. The command is then marked so it will not be reselected, and the operation is repeated to select the next command. This continues until all commands have been placed in the sequence.

In Table 3, command IDs 1, 3, 5, and 7 are the only commands that could be executed first. If mounts are considered more important than demounts, and the accessor is nearest to cartridge B, then command 3 may be selected by the heuristic process as the most desirable.

TABLE 4

| ID | Action | Cart. | Dev. | Gr. 1 | Gr. 2 | Dev. 1 | Dev. 2 | Dev. 3 |
|----|--------|-------|------|-------|-------|--------|--------|--------|
| 3 | GFR | B | | B | | | | C |

Now command IDs 1, 4, 5, and 7 are possible. Let's say that command 1 is selected because the accessor is very close to cartridge A. Note that the GFR action in this case uses gripper 2, as gripper 1 would contain cartridge B at this point.

TABLE 5

| ID | Action | Cart. | Dev. | Gr. 1 | Gr. 2 | Dev. 1 | Dev. 2 | Dev. 3 |
|----|--------|-------|------|-------|-------|--------|--------|--------|
| 3 | GFR | B | | B | | | | C |
| 1 | GFR | A | | | B | A | | C |

Command IDs 2 and 4 (put to device orders) are now the only valid selections because the remaining selections call for unavailable resources, or impossible actions, e.g. pick up a cartridge when a cartridge is already in the gripper or mount a cartridge which is not in a gripper. If the devices are close to each other, it is likely that both of these commands will take the next two positions, as travelling to one device will place the transporter very close to the other.

TABLE 6

| ID | Action | Cart. | Dev. | Gr. 1 | Gr. 2 | Dev. 1 | Dev. 2 | Dev. 3 |
|----|--------|-------|------|-------|-------|--------|--------|--------|
| 3 | GFR | B | | B | | | | C |
| 1 | GFR | A | | | B | A | | C |
| 2 | PTD | B | 2 | | | A | B | C |
| 4 | PTD | A | 1 | | | A | B | C |

Command IDs 5 and 7 are now eligible for selection. Let's say that command 7 is more important in this case because it is associated with a mount (more important than demounts) and the travel time is about the same for each command. After that, only command 5 is possible (command 8 cannot be performed because device 3 contains a cartridge already). After command 5, command 8 will be selected because the accessor is already at the drive and the command is associated with a mount. Command 6 (the only one left) will then complete the sequence.

TABLE 7

| ID | Action | Cart. | Dev. | Gr. 1 | Gr. 2 | Dev. 1 | Dev. 2 | Dev. 3 |
|----|--------|-------|------|-------|-------|--------|--------|--------|
| 3 | GFR | B | | B | | | | C |
| 1 | GFR | A | | | B | A | | C |
| 2 | PTD | B | 2 | | | A | B | C |
| 4 | PTD | A | 1 | | | A | B | C |
| 7 | GFR | D | | D | | A | B | C |
| 5 | GFD | C | 3 | D | C | A | B | |
| 8 | PTD | D | 3 | | | C | A | B | D |
| 6 | PTR | C | | | | A | B | D |

If the optimizer reaches a point where no commands may be placed in the optimized sequence at the current position, the last command in the sequence is removed and marked as being ineligible for that particular sequence position. Ordering is restarted at that point in the sequence. This backtracking allows the process to recover from an invalid sequence situation. Any ineligibility marks for later sequence positions are removed during backtracking, as resource conditions will be different when commands are reevaluated for those positions.

For example, if commands are selected to begin two mount operations to devices with cartridges requiring demounts, a sequence like this could be reached:

TABLE 8

| ID | Action | Cart. | Dev. | Gr. 1 | Gr. 2 | Dev. 1 | Dev. 2 | Dev. 3 |
|----|--------|-------|------|-------|-------|--------|--------|--------|
| 24 | GFR | V | | V | | X | Y | Z |
| 28 | GFR | W | | V | W | X | Y | Z |

No commands can be selected at this point, as there are no grippers available for get operations, and no gripper may be emptied with a put operation because there are cartridges in the devices. In this case, command 28 is removed from the sequence and a different command is selected ("next best").

TABLE 9

| ID | Action | Cart. | Dev. | Gr. 1 | Gr. 2 | Dev. 1 | Dev. 2 | Dev. 3 |
|---|---|---|---|---|---|---|---|---|
| 24 | GFR | V | | V | | X | Y | Z |
| 24 | GFD | W | 1 | | V | X | Y | Z |

If cartridge V is destined for device 1, then the mount may be completed at this point. It is sometimes necessary to backtrack several levels to find an alternate sequence. Backtracking may also be initiated several times when working through a sequence.

Because an initial sequence of the commands is valid, the process will always find some valid sequence.

After sequence optimization, peephole optimization is performed on the list to convert certain common sequences into fewer, more complex operations of which the system is capable. These reducible sequences can be encouraged to come out of the sequence optimization by adjusting the heuristics.

In the earlier example, command IDs 5 and 8 are neighbors in the optimized sequence. If the hardware is capable of performing a "swap" operation at the device (get with one gripper, put with the other) in a faster motion, then the peephole optimizer would perform this type of substitution.

TABLE 10

| ID | Action | Cart. | Dev. | Gr. 1 | Gr. 2 | Dev. 1 | Dev. 2 | Dev. 3 |
|---|---|---|---|---|---|---|---|---|
| 3 | GFR | B | | B | | | | C |
| 1 | GFR | A | | B | A | | | C |
| 2 | PTD | B | 2 | | A | | B | C |
| 4 | PTD | A | 1 | | | A | B | C |
| 7 | GFR | D | | D | | A | B | C |
| 8 | SAD | D | 3 | | C | A | B | D |
| 6 | PTR | C | | | | A | B | D |

Commands are removed for execution from one end of the queue and new commands are added to the other input end. Each time commands are added, the queue is reoptimized, thus providing a continually optimized sequence rather than a set of optimized sequences chained together. A command that has been fetched is not eligible for reordering by the optimizer. In addition, commands generated by peephole optimization may not be changed by the sequence optimizer. This prevents the sequence optimizer from undoing operations performed by the peephole optimizer on a previous invocation.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. For example, those skilled in the art will now realize the scope of the invention extends to include automated libraries utilizing magnetic, optical and magnetic-optic tape or disk libraries. The invention also can include libraries having one or a plurality of robots, or robots with multiple or single grippers. In addition, both multiple or single volumes per storage medium are contemplated. It is therefore contemplated that the appended claims will cover any such modifications or embodiments that fall within the true scope of the invention.

What is claimed is:

1. A method of operating a volume positioning mechanism in an automated library, the library having a plurality of volumes, a plurality of racks for storing the plurality of volumes and at least a first drive unit for recording data to or reading data from a volume mounted thereon by the volume positioning mechanism, the method comprising the steps performed by a data processing system of:

processing each exogenous request for data in a volume to generate at least a first command for execution by the volume positioning mechanism;

providing a command queue having a queue input level, a queue output level for the next scheduled command for execution and allowing a plurality of intervening levels;

adding the at least first command to a command queue at the command queue input level;

responsive to addition of a command to the command queue, selecting a command for each level in the queue by, qualifying commands for execution at a particular level, responsive to qualification of at least a first command for execution at the particular level, scoring each qualified command for execution at the particular level, placing the qualified command with the highest score in the command queue at the particular level and disqualifying the qualified command for consideration at any remaining levels;

projecting a system state for after execution of the qualified command placed at a level in the command queue; and storing the projected system state with the command in the command queue;

scanning the command queue for preselected patterns among adjacent commands; and responsive to location of an example of a preselected pattern, substituting a complex command for the adjacent commands.

2. A method of operating a volume positioning mechanism in an automated library, the library having a plurality of volumes, a plurality of racks for storing the plurality of volumes and at least a first drive unit for recording data to or reading data from a volume mounted thereon by the volume positioning mechanism, as set forth in claim 1, the method further comprising the steps performed by a data processing system of:

responsive to failure to qualify a command for execution at a level, resetting as a current level an immediately preceding level;

disqualifying the command at the current level;

resetting the projected system state to that saved for a level preceding the current level; and reexecuting the selecting step for the current level.

3. A method of operating a volume positioning mechanism in an automated library, the library having a plurality of volumes, a plurality of racks for storing the plurality of volumes and at least a first drive unit for recording data to or reading data from a volume mounted thereon by the volume positioning mechanism, as set forth in claim 1, wherein the step of scoring includes the further steps of:

scoring a command for execution as a function of time in the command queue, priority of the exogenous request from which the command was generated, location of the volume positioning mechanism and the projected system state.

4. A method of operating a volume positioning mechanism in an automated library, the library having a plurality of volumes, a plurality of racks for storing the plurality of volumes and at least a first drive unit for recording data to or reading data from a volume mounted thereon by the volume positioning mechanism, as set forth in claim 1, further comprising the step of:

blocking complex commands from further selection for levels in the command queue; and wherein commands at levels between a level of a complex command and the command queue output level are blocked from further selection for levels in the command queue.

5. A method of operating a volume positioning mechanism in an automated library, the library having a plurality of volumes, a plurality of racks for storing the plurality of volumes and at least a first drive unit for recording data to or reading data from a volume mounted thereon by the volume positioning mechanism, as set forth in claim 1, further comprising the step of:

periodically fetching previously unfetched commands from levels closest to the command queue output level for execution, thereby blocking further selection of those previously unfetched commands for reordering in the command queue.

6. An automated data storage library for supporting operation of a data base in a data processing system, comprising:

a plurality of volumes;

a plurality of storage locations for volumes; at least a first drive unit for reading information from and storing information to volumes;

transporter means for transferring a volume between the storage locations and the first drive unit;

a source of data requests;

means responsive to receipt of a data request for generating at least a first command for execution by the transporter means;

a command queue supporting a plurality of levels for commands progressing toward execution from a command queue input to a command queue output;

means for placing the at least first command into a command queue along with a projected system state for after execution of the at least a first command beginning at the command queue input;

means for sequencing the commands in the command queue including means responsive to qualification of at least a first command for execution at a particular level for scoring each qualified command for execution at the particular level and means for placing the qualified command with the highest score in the command queue at the particular level;

means for projecting a system state for after execution of the command placed at a level in the command queue;

means for storing the projected system state with the command in the command queue;

means responsive to failure to qualify a command for execution at a level for resetting as a new current level an immediately preceding level;

means for disqualifying the command at the new current level;

means for resetting the projected system state to that saved for a command at a level preceding the new current level;

means for locating preselected patterns of commands occurring in the command queue; and means for substituting a complex command for a located preselected pattern of commands.

7. An automated data storage library for supporting operation of a data base in a data processing system as set forth in claim 6 and further comprising:

means for scoring a command for execution as a function of its elapsed time in the command queue, priority of the data request from which the command was generated, location of the transporter means and the projected system state subsequent to execution of any commands in the command queue ahead of the command being scored.

8. An automated data storage library for supporting operation of a data base in a data processing system as set forth in claim 7 and further comprising:

means for blocking complex commands from further selection for levels in the command queue; and wherein commands at levels between a level of a complex command and the command queue output level are also blocked from further selection for reordering in the command queue.

9. An automated data storage library for supporting operation of a data base in a data processing system as set forth in claim 8 and further comprising:

means for periodically fetching previously unfetched commands from levels closest to the command queue output level for execution, thereby blocking further selection of those previously unfetched commands for reordering in the command queue.

* * * * *

UNITED STATES PATENT AND TRADEMARK OFFICE
CERTIFICATE OF CORRECTION

PATENT NO. : 5,418,971

DATED : May 23, 1995

INVENTOR(S) : Wayne C. Carlson

It is certified that error appears in the above-indentified patent and that said Letters Patent is hereby corrected as shown below:

--Column 6, line 2-- after "queue" and before "between," insert --66--.

--Column 6, line 15-- after "step" insert --118.--.

Signed and Sealed this

Nineteenth Day of December, 1995

Attest:

BRUCE LEHMAN

Attesting Officer     Commissioner of Patents and Trademarks